United States Patent
Jonsson et al.

(10) Patent No.: US 8,164,413 B2
(45) Date of Patent: Apr. 24, 2012

(54) ELECTRIC INSULATION ARRANGEMENT

(75) Inventors: Erik Jonsson, Trondheim (NO); Lars Palmqvist, Alingsås (SE)

(73) Assignee: ABB Research Ltd., Zürich (CH)

(*) Notice: Subject to any disclaimer, the term of this patent is extended or adjusted under 35 U.S.C. 154(b) by 358 days.

(21) Appl. No.: 12/593,983

(22) PCT Filed: Mar. 26, 2008

(86) PCT No.: PCT/EP2008/053556
§ 371 (c)(1),
(2), (4) Date: Sep. 30, 2009

(87) PCT Pub. No.: WO2008/119705
PCT Pub. Date: Oct. 9, 2008

(65) Prior Publication Data
US 2010/0147556 A1    Jun. 17, 2010

(30) Foreign Application Priority Data
Mar. 30, 2007    (EP) .................................... 07105386

(51) Int. Cl.
*H01C 7/10* (2006.01)
(52) U.S. Cl. ............................ 338/21; 252/511; 428/331
(58) Field of Classification Search ............... 338/22 R, 338/20–21; 428/329, 331, 403; 252/511–513, 252/519
See application file for complete search history.

(56) References Cited

U.S. PATENT DOCUMENTS

| | | | | |
|---|---|---|---|---|
| 4,726,991 A | * | 2/1988 | Hyatt et al. | 428/329 |
| 6,143,206 A | * | 11/2000 | Handa et al. | 252/500 |
| 6,452,476 B1 | * | 9/2002 | Handa | 338/22 R |
| 2005/0139373 A1 | | 6/2005 | Gramespacher et al. | |

FOREIGN PATENT DOCUMENTS
EP    1337022 A1    8/2003

OTHER PUBLICATIONS

Eva Martensson, et al; "Electrical Properties of Field Grading Materials with Silicon Carbide and Carbon Black"; IEEE 1998 Conference on Conduction and Breakdown in Solid Dielectrics, 1998; pp. 548-5652.
Tetsuchi Okamoto et al; "Percolation Phenomena of Field Grading Materials Made of Two Kinds of Filler"; Electrical Insulating Materials, 2001; Proceedings of 2001 International Symposium, pp. 83-86.
PCT/ISA/210—International Search Report—Jul. 23, 2008.
PCT/ISA/237—Written Opinion of the International Searching Authority—Jul. 23, 2008.
PCT/IPEA/409—International Preliminary Report on Patentability—Jun. 22, 2009.

* cited by examiner

*Primary Examiner* — Kyung Lee
(74) *Attorney, Agent, or Firm* — Venable LLP; Eric J. Franklin

(57) ABSTRACT

An electric insulation arrangement including a field grading material including a matrix including a dielectric material. A plurality of micro varistor particles is distributed in the matrix. A plurality of bridge particles include an electrically conducting material and form electrically conducting bridges between individual micro varistor particles. The bridge particles form a percolating network together with the micro particles but do not form a percolating network by interconnection between themselves.

31 Claims, 2 Drawing Sheets

ELECTRIC INSULATION ARRANGEMENT

CROSS-REFERENCE TO RELATED APPLICATIONS

This application claims priority to European patent application 07105386.2 filed 30 Mar. 2007 is the national phase under 35 U.S.C. §371 of PCT/EP2008/053556 filed 26 Mar. 2008.

TECHNICAL FIELD

The present invention relates to an electric insulation arrangement comprising an electric insulator and a field grading body, said field grading body comprising a field grading material that comprises: a matrix comprising a dielectric material; a plurality of micro varistor particles distributed in said matrix, and; a plurality of bridge particles comprising an electrically conducting material and forming electrically conducting bridges between individual micro varistor particles.

Micro varistor particles as referred herein comprise particles that comprise a material the electrical resistivity of which is non-linearly dependent of the strength of an electric field applied thereto.

BACKGROUND OF THE INVENTION AND PRIOR ART

At the transition of an electric field from a first medium to a second medium, electric stresses harmful to the electric equipment may arise due to the resulting electric field. In a shielded high-voltage cable for instance, the electric field is uniform along the cable axis and there is a variation in the field only in the radial direction. When the cable is terminated or spliced, the shield of the cable is removed for a distance along the cable. The removal of the shield causes a discontinuity in the electric field at the shield end, resulting in high electric stresses. These high stresses must be reduced in order not to impair the expected life of the system.

The electric stresses in question can be reduced by grading the electric field at the transition of the electric field from the first medium to the second medium, e.g. from a shielded cable part to a cable part where the original shield has been removed. A number of methods have been developed and employed for this kind of field grading. The present invention is related to so called resistive and capacitive field grading.

The resistive field grading can be used in alternating current as well as direct current application. Resistive field grading may also be used in order to achieve field grading when voltages are occurring in the form of impulses. In case of a cable ending of the kind indicated above, a body having a suitable resistance is introduced around the unshielded part of the cable in the area closest to the shielded part of the cable and in electric contact with the shield. When a voltage is applied across the cable a current flows through the body towards the shield of the cable, which shield is at earth potential. A resistive voltage drop then occurs in the body, resulting in a more uniform distribution of the potential. This potential distribution will be more linear if the body consists of a material exhibiting a non-linear electrical resistance that decreases with an increasing electric field. The closer to the edge of the shield, the higher the electric field will be in the field grading body and, consequently, the lower the electrical resistance in the body if the body exhibits such a non-linear electrical resistance. In this way, the voltage drop along the field grading body will become more uniformly distributed in a body that exhibits such a non-linear electrical resistance than in a body that does not.

The capacitive field grading is used in alternating current applications. However, capacitive field grading may also be used in order to achieve field grading when voltages are occurring in the form of impulses. In case of a cable ending of the kind indicated above, a body of a material having a dielectric constant higher than that of the insulation and as low losses as possible is introduced around the unshielded part of the cable in the area closest to the shielded part of the cable and in electric contact with the shield, whereby a spreading of the equipotential lines will be achieved. Capacitive filed grading properties are also desired in a material adapted for grading the electric field in high voltage direct current applications so as to achieve an effective field grading in case of suddenly occurring voltage surges.

The field grading material used in field grading bodies of prior art comprises a dielectric matrix, normally a polymer, and a plurality of micro varistor particles evenly distributed in said matrix. The micro varistor particles comprise a material the distinguishing property of which is its electrical resistivity, which is to a large extent dependent of the strength of an electric field applied thereto. The dependency is non-linear. Typical micro varistor particle materials are materials such as SiC or ZnO. Normally, said micro varistor particles are of spherical shape with a mean diameter size in the range of 30-100 μm. Typically, they occupy approximately 20-25% of the volume of the field grading material.

However, in order to fulfil their task of conducting an electrical current and thereby equalising an electrical field, the micro varistor particles must be added to the matrix material in such an amount that they will heavily impact the mechanical properties of the field grading material, making it more rigid, more brittle and less readily workable into the shape needed for a specific application.

In order to solve this problem, prior art suggests the incorporation of a plurality further particles, of electrically conducting character, but having, less detrimental effect on the mechanical properties of the field grading material than has the micro varistor particles. Prior art thereby suggests the use of carbon black as such further particles. By the introduction of such further electrically conducting particles the resistivity of which is to a much lesser degree dependent of the strength of an applied electric field, the concentration of the micro varistor particles may be reduced, since the carbon black particles, if added to a sufficient amount, will form electrically conducting bridges between individual micro varistor particles.

However, the carbon black particles will also induce an increase of the electrical conductivity to a piece of field grading material in the non-excited condition thereof, i.e. when there is no electric field applied thereto or only a weak electric field thereto. Such conductivity will result in losses and is, accordingly, of disadvantage for the total efficiency of an insulation arrangement using a field grading body made of such a field grading material.

THE OBJECT OF THE INVENTION

It is an object of the present invention to present an electric insulation arrangement provided with a field grading body with a field grading material as initially defined, which present a resistivity which is strongly dependent of the strength of an electric field applied thereto, which is readily workable, and which, when subjected to an electric field of low strength, presents a resistivity as high as possible.

It is also an object of the present invention to present an electric insulation arrangement provided with a field grading body with a field grading material the design of which promotes a low electric resistivity of said material when subjected to an electric field of elevated strength, i.e. a strength high enough to set the micro varistor particles into their electrically conducting state.

SUMMARY OF THE INVENTION

The object of the invention is achieved by means of the initially defined electric insulation arrangement, characterised in that said bridge particles form a percolating network together with said micro varistor particles but do not form a percolating network by interconnection between themselves. The micro varistor particles may, but need not, form a percolating network by interconnection between themselves. The concept of the invention is based on the insight that bridge particles such as carbon black particles, to a large extent due to their small size, and in order to present the technical effect requested, need to be added in such an amount to the field grading material that they would, at least to some extent form a percolating network between themselves, that would be able to conduct an electric current also under electrical field conditions when the micro varistor particles would not be excited, and thereby induce unwanted electrical losses. In cases where the micro varistor particles themselves form a percolating network, and the need of the bridge particles might seem less interesting, there might still be an advantage in adding such particles, since they will still be able to increase number of contact sites between the micro varistor particles through which an electric current may be conducted, thereby contributing to a lower minimum resistivity of the field grading material as such. It should be understood that the bridge particles are distributed in said matrix to such an extent and have such a shape and size that they form a percolating network together with said micro particles but do not form a percolating network by interconnection between themselves. Within this scope there are numerous solutions obvious to the person skilled in the art or at least achievable without undue experimentation. Electrical conductivity tests may be performed for each solution in order to establish whether a specific solution fulfils the idea of the invention.

According to one embodiment, said micro varistor particles and said bridge particles are three-dimensional particles, wherein the size of the bridge particle in their largest dimension is a and the size of the size of the micro varistor particles in their largest dimension is b, and $a/b > 1/100$. Preferably $a/b > 1/20$, and even more preferably $a/b > 1/5$, or $a/b > 1/3$. The bridge particles of prior art made were of nano-size up to about $0.1\ \mu m$. In other words, the size ratio between bridge particles and micro varistor particles were in the order of 1/300 or even less. By radically increasing this ratio, as suggested by the invention, the probability of achieving a good bridging function but still avoiding a percolation network formed by the bridge particles themselves will be much improved.

According to one embodiment, said micro varistor particles and said bridge particles are three-dimensional particles, wherein the size of the bridge particle in their largest dimension is a and the size of the micro varistor particles in their largest dimension is b, and $a/b < 20$. Preferably $a/b < 5$. According to yet a preferred embodiment $a/b < 2$, and even more preferred $a/b < 1$.

According to one embodiment, said micro varistor particles are three-dimensional particles, wherein the size of the micro varistor particles in their largest dimension is b, and b is in the range of $5\ \mu m$ to $100\ \mu m$. According to one embodiment $b > 20\ \mu m$, and according to another embodiment $b > 30\ \mu m$.

According to one embodiment, said micro varistor particles occupy 5-40% of the volume of the field grading material.

According to one embodiment, said micro varistor particles occupy 20-25% of the volume of the field grading material.

According to one embodiment, said micro varistor particles are of spherical shape. However, it should be understood that among the plurality of micro varistor particles, there might also be present particles of other shape than spherical, but that at least some of the particles, preferably a major part thereof, are spherical.

According to one embodiment, said bridge particles comprise three dimensional particles the extension of which in one dimension is at least 10 times larger than the extension in each of the remaining two dimensions. In other words, the bridge particles may be elongated, or rod-shaped. Also bent or curved particles of this general structure are conceived and included in this embodiment.

According to one embodiment, said bridge particles comprise three-dimensional particles the extension of which in each of two of its dimensions is at least 10 times larger than the extension in the remaining third dimension. Accordingly, the bridge particles may be flake-shaped or sheet-shaped. The invention also includes embodiments in which such flakes are bent or curved.

According to one embodiment, said bridge particles comprise three-dimensional particles the extension of which in their largest dimension is at most 2 times larger than the extension in the smallest dimension.

According to one embodiment, said bridge particles comprise three-dimensional particles with equal extension in all three dimensions. Typically such particles are either of cubical or spherical shape.

According to one embodiment, said bridge particles, at least on an outer surface thereof, comprise a material that presents an electric resistivity that is lower than the highest resistivity of the material of the micro varistor particles. In other words, the resistivity of the material of the bridge particles will never, during operation, be higher than that of the material of the micro varistor particles. This characteristic feature will reduce the amount of bridge particles needed in order to achieve a certain electric conductivity of the field grading material.

According to one embodiment, said bridge particles, at least on an outer surface thereof, comprise a material that presents an electric resistivity that is lower than the lowest resistivity of the material of the micro varistor particles. This characteristic feature will even further reduce the amount of bridge particles needed in order to achieve a certain electric conductivity of the field grading material.

According to one embodiment, said bridge particles, at least on the outer surface thereof, comprise an electrically conducting material the electric resistivity of which is less dependent of an electric field to which it is subjected than is the resistivity of the material of said micro varistor particles. The resistivity of said material may to a certain degree be dependent of the strength of an electric field applied thereto, but need not, and will typically not be of non-linear dependency like the material of the micro varistor elements. This freedom will widen the scope of materials possible for use as the material of the bridge particles, and will promote the use of a material that has the least detrimental effect on the mechanical properties and workability of the field grading material.

According to one embodiment, said bridge particles, at least on an outer surface thereof, comprise an electrically conducting material the electric resistivity of which is independent of the strength of an electric field to which it is subjected.

According to one embodiment, the total electric resistance of the bridge particles is lower than the total electric resistance of the micro varistor particles, at least up to a predetermined level of the strength of an electric field to which a body of the field grading material is subjected. Accordingly, upon application of a certain electric field, the micro varistor particles and the bridge particles will form a percolating network, the conductibility of which corresponds to or is higher the one of a percolating network only consisting of micro varistor particles, at least up to said pre-determined level of the applied electric field.

According to one embodiment, the total electric resistance of the bridge particles is lower than the total electric resistance of the micro varistor particles, independently of the level of the strength of an electric field to which a body of the field grading material is subjected. Accordingly, upon application of a certain electric field, the micro varistor particles and the bridge particles will form a percolating network, the conductibility of which corresponds to the one of a percolating network only consisting of micro varistor particles, irrespectively of the strength of the applied electric field.

According to one embodiment, said electrically conducting material of the bridge particles is a material which is chemically stable in relation to the surrounding material of the field grading material at local peak temperatures that arise upon application of a high voltage electric field to the field grading material. When the electric field material is subjected to a strong electric field, there will be a heavy increase of the temperature at the contact sites between electrically conducting particles in the field grading material. Temperature changes of several hundred degrees Celsius may occur at said sites, while the temperature of a body of said field grading material will, at the same time, only change with a few degrees. In order to ensure a long life of the field grading material, the material of the bridge particles should therefore be of a type that is chemically stable in the given environment up to at least the temperatures assumed to occur at said sites.

According to one embodiment, said electrically conducting material of the bridge particles comprises an oxide.

According to one embodiment, said oxide comprises any one of $SnO_2$ doped with antimony, $TiO_2$ or a combination thereof.

According to one embodiment, said bridge particles comprise a carrier substrate onto the outer surface of which said electrically conducting material is deposited. The use of a substrate may promote the use electrically conducting materials that, in themselves, are not readily workable to the given shape or size of the bridge particles that is required. The use of a substrate also widens the possibility of tailoring, to a higher degree than else and by the choice of a suitable material, the mechanical properties of the bridge particles, which would otherwise be only determined by the electrically conducting material.

According to one embodiment, said carrier substrate comprises mica.

According to an alternative embodiment, said carrier substrate comprises $SiO_2$.

The insulation arrangement may also typically include a shield made of a conducting material, and possibly in connection with said field grading body. Typically, such an electric insulation arrangement is provided in connection to a high voltage conductor. The electric insulator may comprise a dielectric material such as a polymer. The shield may be separated from the conductor by the insulator. The field grading body may be provided at a location along the body where there is no shield, i.e. an unshielded portion thereof. Preferably, the field grading body is separated from the conductor by the insulator. It is also preferred that the field grading body be attached to said insulator, thereby covering at least a part thereof, which is unshielded by the shield. Insulation arrangements of this kind are preferably included in shielded cable connections, cable terminations, cable splices, or bushings, for instance bushings to electric transformer stations. In other words, an insulation arrangement according to the invention is, preferably, used in any application in which electrical stresses are to be reduced at the transition of an electric field from a first medium to a second medium.

In particular, the electric insulation arrangement of the invention forms an electric insulation arrangement of an electric cable, comprising at least one electric conductor, covered by an insulator along a part thereof, and sheathed by a an electrically conducting shield and by a field grading body, wherein said field grading body comprises said field grading material. Preferably, a part, typically an end part, of the insulator that is unsheathed by the shield is instead covered by the field grading body, the latter preferably being in electrically conducting contact with said shield, which in its turn may be at earth potential or connected to a high voltage source/conductor. Further features and advantages will be disclosed in the following detailed description.

BRIEF DESCRIPTION OF THE DRAWINGS

In the annexed drawing.

DETAILED DESCRIPTION OF THE INVENTION

Figure 1:
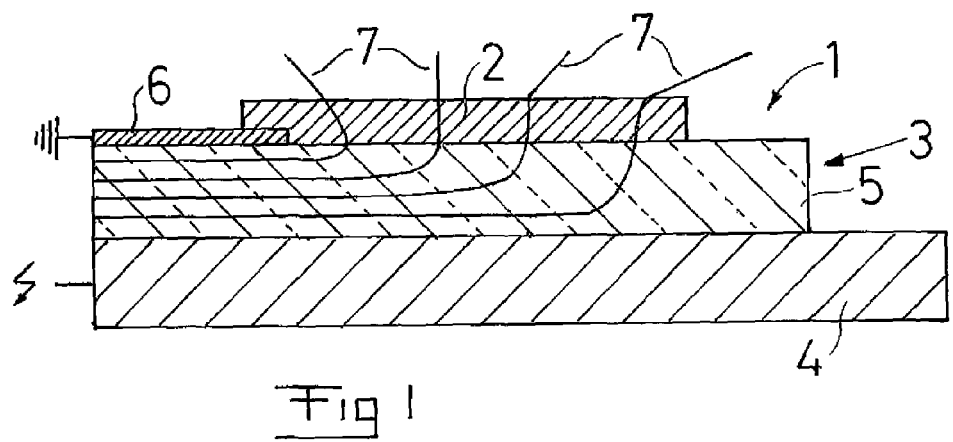
FIG. 1 is a schematic representation of a electric insulation arrangement according to the invention.

FIG. 1 illustrates a cable termination 1 provided with a body 2 of a field grading material according to the present invention. The cable 3 comprises a conductor 4 surrounded by an electric insulation 5. A shield 6 is arranged outside the insulation 5, said shield 6 being connected to ground. The end of the cable 3 is unshielded, i.e. at the end of the cable the insulation 5 is not covered by any shield. The body 2 of the field grading material is introduced around the unshielded part of the cable in the area closest to the shielded part of the cable and in electric contact with the shield 6. The body 2 of field grading material will secure a uniform distribution of the potential at the cable termination, as illustrated by the equipotential lines 7 in FIG. 1. It should also be mentioned that only the upper half of the longitudinal section of the cable termination is shown in FIG. 1.

Figure 2:
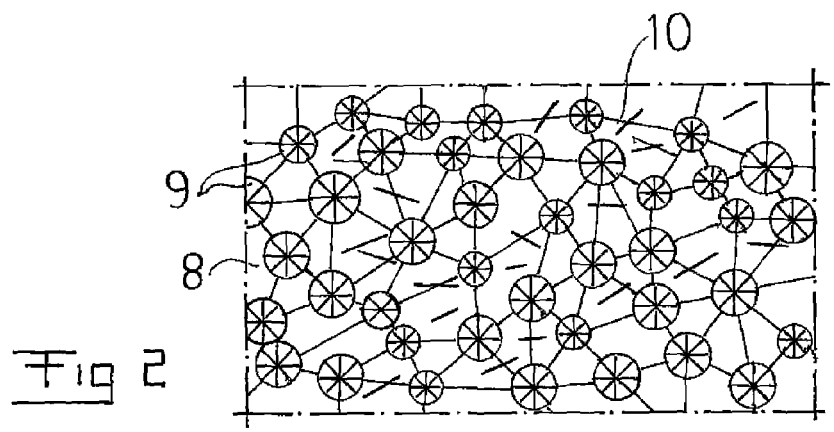
FIG. 2 is a schematic representation of a cross-section of a field grading material in accordance with the invention.

FIG. 2 illustrates a suggested principal structure of the field grading material of the invention. The field grading material comprises a matrix 8 of a generally dielectric material such as a polymer. Such a polymer may be an elastomer such as silicone or EPDM; thermoplastic polymers, for example polyethylene or polypropylene: adhesives, for example those based on ethylene-vinyl-acetate; thermoplastic elastomer; thixotropic paints; gels, thermosetting material, for example epoxy or polyurhethane resins; or a combination of such materials, including co-polymers, for example a combination of polyisobutylene and amorphous polypropylene. The kind of matrix material used should be chosen with regard to the specific requirements and conditions of specific applications.

The matrix 8 is filled with micro varistor particles 9 of spherical shape and with diameter in the range of 30-100 µm, though the sizes may follow some kind of normal distribution curve and, therefore, some of the particles may fall outside said range. Typically, the micro varistor particles 9 comprise a material the electrical resistivity of which is non-linearly dependent of the strength of an electric field applied thereto. Since the varistor effect is an effect well known to the person skilled in the art, no further explanation thereof will be presented here.

The micro varistor particles 9 may occupy between 5 and 60% of the volume of the field grading material, preferably between 10 and 40%, and most preferably between 20 and 25% of the volume thereof. They may or may not form a percolating network by themselves. However, for the sake of clarity, the embodiment shown in FIG. 2 presents a material in which the micro varistor particles do not form a percolating network by themselves.

Further to the micro varistor particles 9 the field grading material also comprises a plurality of bridge particles 10 comprising an electrically conducting material and provided for the purpose of maintaining the electrically conductivity of the field grading material also for lower contents of the micro varistor particles 9, or for improving the conductivity of the field grading material for a given content of micro varistor particles 9 by introducing further electrical connections between the micro varistor particles. The bridge particles 10 may be of elongated, planar, flake-like, cubic, spherical or other suitable shape as long as the fulfil some vital conditions, apart from being electrically conducting. They should be of such size, shape and amount that they are able to form a percolating network together with the micro varistor particles 9. However, they should not form a percolating network on their own. If an electric field of low strength is applied to the field grading material, i.e. a level below the excitation level of the micro varistor particles, under which circumstances there is not requested any conductivity of the field grading material, the bridge particles are not supposed to conduct electric current through the material. A small leak current may occur due to some remaining conductivity of the varistor particles even at low strength or non-existing electrical fields, but the important thing is that there will be no important electrical losses due to any percolating network between the bridge particles 10 themselves.

Figure 3:
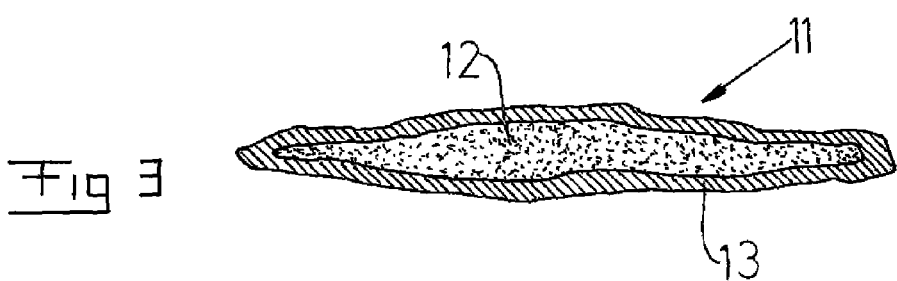
FIG. 3 is a schematic representation of one embodiment of a bridge particle according to the invention.

FIG. 3 illustrates a first example of a bridge particle 11 according to the invention. The bridge particle 11 of this embodiment comprises a carrier substrate 12 which, in this specific case comprises mica but might comprise any other suitable material like $SiO_2$. On the outer surface of the carrier substrate there is provided a conducting material 13 which, in the embodiment in question, comprises antimony-doped tin oxide. The carrier substrate 12 provides for a specific shape of the particle, a certain chemical stability, and, possibly, specific mechanical properties of the particle, while the conducting material 13 has as its main task to provide for electrical conductivity, as well as chemical stability with regard to the surrounding environment, also at elevated temperatures such as those that may occur locally in the material upon application of electric fields of high strength.

Figure 4:
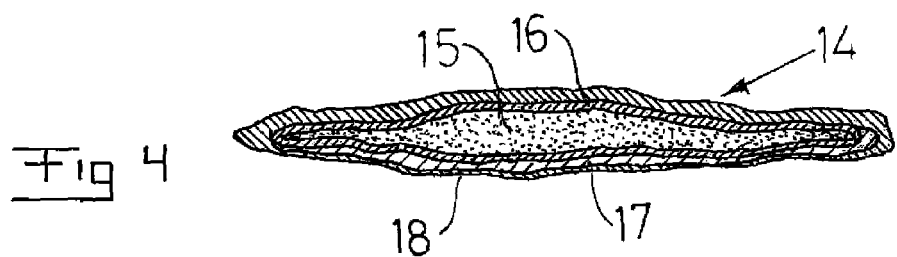
FIG. 4 is a schematic representation of another embodiment of a bridge particle according to the invention.

FIG. 4 illustrates an alternative embodiment of a bridge particle 14 according to the invention. Also in this case there is provided a carrier substrate 15, comprising mica, though other suitable materials such as $SiO_2$ are also conceived. The outer surface of the carrier substrate is covered by a thin layer 16 of titanium dioxide, which, in its turn, is covered by a thin layer 17 of silicon dioxide, $SiO_2$, which, in its turn is covered by a layer 18 of antimony-doped tin oxide.

EXAMPLES

To a polymer matrix was added micro varistor particles and bridge particles in such an amount that the amount of micro varistor particles in the final compound was 20 volume % and the amount of bridge particles was 10 volume % of the total compound. The bridge particles comprised mica flakes covered by a layer of antimony-doped tin oxide of a thickness of 10-50 nm. The bridge particles were of the type manufactured by MERCK and sold under the trade name Minatec 31 CM. The micro varistor particles comprised ZnO, were of generally spherical shape and had a diameter in the range of 30 µm. The approximate size of the bridge particles, in their main extension plane, was ~10-15 µm. The powder was mixed with and compounded in an EPDM rubber that formed a matrix for the powder. The volume percentage of the powder with regard to the whole compound was approximately 30%.

A second material, forming a comparative example, was also provided. The second compound consists of 20-30 volume % ZnO micro varistor particles and 2-10 volume % of bridge particles comprising carbon black. The micro varistor particles were of generally spherical shape and had a diameter in the range of 30 µm. The approximate size or diameter of the bridge particles was 30-100 nm. A powder of the micro varistor particles and the carbon black particles was mixed with and compounded in an EPDM rubber that formed a matrix for the powder. The volume percentage of the micro varistor particles and the bridging particles, with regard to the whole compound, was approximately 25-35 v %.

Figure 5:
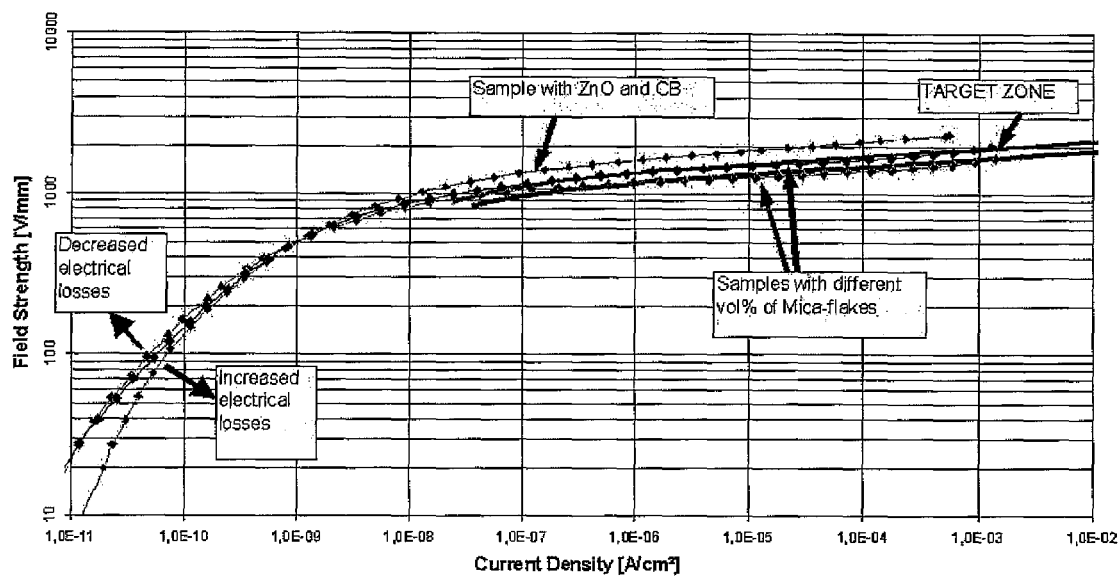
FIG. 5 is a diagram showing test results for field grading materials according to the invention as compared to a comparative example according to prior art.

Samples of the two compounds were provided, and there were tests conducted in which the current density, measured as Ampere/$cm^2$ versus field strength, measured as Volts/mm, was plotted for each of the three samples. The results of the tests are shown in FIG. 5. It is obvious from the tests that the field grading materials of the invention, as here represented by the first the above compounds, resulted in better field grading properties as well as lower electrical losses.

It should be understood that the embodiments of the invention described are only examples of the invention and that alternative solutions within the scope of the invention as limited by the patent claims will be obvious for a person skilled in the art. Accordingly, the scope of protection is defined by the annexed patent claims, supported by the description an the annexed drawing.

The invention claimed is:

1. An electric insulation arrangement, comprising:
    an electric insulator and a field grading body, said field grading body comprising field grading material comprising
    a matrix comprising a dielectric material,
    a plurality of micro varistor particles distributed in said matrix, and
    a plurality of bridge particles comprising an electrically conducting material and forming electrically conducting bridges between individual micro varistor particles wherein said bridge particles form a percolating network together with said micro varistor particles but do not form a percolating network by interconnection between themselves.

2. The electric insulation arrangement according to claim 1, wherein said micro varistor particles and said bridge particles are three-dimensional particles, wherein the a size of the bridge particles in a largest dimension is a and the size of the micro varistor particles in their largest dimension is b, and a/b >1/100.

3. The electric insulation arrangement according to claim 2, wherein a/b >1/20.

4. The electric insulation arrangement according to claim 2, wherein a/b >1/5.

5. The electric insulation arrangement according to claim 2, wherein a/b >1/3.

6. The electric insulation arrangement according to claim 1, wherein said micro varistor particles and said bridge particles are three-dimensional particles, wherein the size of the bridge particle in a largest dimension is a and the size of the micro varistor particles in a largest dimension is b, and a/b <20.

7. The electric insulation arrangement according to claim 6, wherein a/b <5.

8. The electric insulation arrangement according to claim 6, wherein a/b <2.

9. The electric insulation arrangement according to claim 6, wherein a/b <1.

10. The electric insulation arrangement according to claim 1, wherein said micro varistor particles are three-dimensional particles, wherein the size of the micro varistor particles in a largest dimension is b, and b is in the range of 5μm to 100 μm.

11. The electric insulation arrangement according to claim 10, wherein b >20μm.

12. The electric insulation arrangement according to claim 1, wherein said micro varistor particles occupy 5-40% of a volume of the field grading material.

13. The electric insulation arrangement according to claim 1, wherein said micro varistor particles occupy 20-25% of a volume of the field grading material.

14. The electric insulation arrangement according to claim 1, wherein said micro varistor particles are of spherical shape.

15. The electric insulation arrangement according to claim 1, wherein said bridge particles comprise three dimensional particles an extension of which in one dimension is at least 10 times larger than the extension in each of remaining two dimensions.

16. The electric insulation arrangement according to claim 1, wherein said bridge particles comprise three-dimensional particles an extension of which in each of two dimensions is at least 10 times larger than an extension in a remaining third dimension.

17. The electric insulation arrangement according to claim 1, wherein said bridge particles comprise three-dimensional particles an extension of which in a largest dimension is at most 2 times larger than an extension in a smallest dimension.

18. The electric insulation arrangement according to claim 1, wherein said bridge particles comprise three-dimensional particles with equal extension in all three dimensions.

19. The electric insulation arrangement according to claim 1, wherein said bridge particles, at least on an outer surface thereof, comprise a material having a resistivity that is lower than a highest resistivity of the material of the micro varistor particles.

20. The electric insulation arrangement according to claim 1, wherein said bridge particles, at least on an outer surface thereof, comprise a material that has resistivity that is lower than a lowest resistivity of the material of the micro varistor particles.

21. The electric insulation arrangement according to claim 1, wherein said bridge particles, at least on the outer surface thereof, comprise an electrically conducting material the resistivity of which is less dependent of an electric field to which it is subjected than is the resistivity of the material of said micro varistor particles.

22. The electric insulation arrangement according to claim 1, wherein said bridge particles, at least on an outer surface thereof, comprise an electrically conducting material the resistivity of which is independent of the strength of an electric field to which it is subjected.

23. The electric insulation arrangement according to claim 1, wherein the total electric resistance of the bridge particles is lower than the total electric resistance of the micro varistor particles, at least up to a pre-determined level of the strength of an electric field to which a body of the field grading material is subjected.

24. The electric insulation arrangement according to claim 1, wherein a total electric resistance of the bridge particles is lower than the total electric resistance of the micro varistor particles, independently of the level of the strength of an electric field to which a body of the field grading material is subjected.

25. The electric insulation arrangement according to claim 1, wherein said electrically conducting material of the bridge particles is a material which is chemically stable in relation to the surrounding material of the field grading material at local peak temperatures that arise upon application of a high voltage electric field to the field grading material.

26. The electric insulation arrangement according to claim 1, wherein said electrically conducting material of the bridge particles comprises an oxide.

27. The electric insulation arrangement according to claim 26, wherein said oxide comprises any one of $SnO_2$ doped with antimony, $TiO_2$ or a combination thereof.

28. The electric insulation arrangement according to claim 1, wherein said bridge particles comprise a carrier substrate onto the outer surface of which said electrically conducting material is deposited.

29. The electric insulation arrangement according to claim 28, wherein said carrier substrate comprises mica.

30. The electric insulation arrangement according to claim 28, wherein said carrier substrate comprises $SiO_2$.

31. The electric insulation arrangement according to claim 1, wherein the electric insulation arrangement forms an electric insulation arrangement of an electric cable, comprising at least one electric conductor, covered by an insulator along a part thereof, and sheathed by an electrically conducting shield and by a field grading body, wherein said field grading body comprises said field grading material.

* * * * *